(12) United States Patent
Kenealy et al.

(10) Patent No.: US 9,457,932 B2
(45) Date of Patent: Oct. 4, 2016

(54) BARREL CONSTRUCTION

(71) Applicant: DB GLOBAL LLC, Ruffin, NC (US)

(72) Inventors: David Kenealy, Ruffin, NC (US); John R. Cannon, South Boston, VA (US); James E. Rubino, Hickory, NC (US)

(73) Assignee: DB Global LLC, Ruffin, NC (US)

( * ) Notice: Subject to any disclaimer, the term of this patent is extended or adjusted under 35 U.S.C. 154(b) by 735 days.

(21) Appl. No.: 13/771,963

(22) Filed: Feb. 20, 2013

(65) Prior Publication Data

US 2013/0233830 A1 Sep. 12, 2013

Related U.S. Application Data

(63) Continuation-in-part of application No. 12/788,991, filed on May 27, 2010, now Pat. No. 8,381,926.

(60) Provisional application No. 61/182,317, filed on May 29, 2009.

(51) Int. Cl.
| | |
|---|---|
| *B65D 25/20* | (2006.01) |
| *B65D 8/00* | (2006.01) |
| *B27H 3/02* | (2006.01) |
| *B65D 6/14* | (2006.01) |
| *B65D 6/34* | (2006.01) |

(Continued)

(52) U.S. Cl.
CPC ............... *B65D 25/20* (2013.01); *B27H 3/02* (2013.01); *B65D 9/04* (2013.01); *B65D 9/30* (2013.01); *B65D 9/34* (2013.01); *B65D 88/08* (2013.01); *B65D 9/38* (2013.01); *B65D 45/32* (2013.01); *Y10T 292/205* (2015.04)

(58) Field of Classification Search
CPC . B65D 9/04; B65D 9/32–9/38; B65D 7/045; B65D 7/12; B65D 7/24; B65D 7/22; B65D 25/20; B65D 88/06; B65D 88/08; B65D 39/082; B65D 39/02; B65D 41/0442; B65D 53/02; B65D 53/04; B65D 50/065; B65D 55/0881
USPC ............................... 220/4.11; 217/88, 91, 93
See application file for complete search history.

(56) References Cited

U.S. PATENT DOCUMENTS

| | | |
|---|---|---|
| 59,622 A | 3/1866 | Merrill |
| 58,821 A | 10/1866 | Hickey |

(Continued)

FOREIGN PATENT DOCUMENTS

| | | |
|---|---|---|
| DE | 819 812 | 11/1951 |
| EP | 0 139 529 | 10/1984 |

(Continued)

OTHER PUBLICATIONS

Tonnellerie Renaissance Barrell Kit information sheet; undated, admitted prior art.

(Continued)

*Primary Examiner* — Anthony Stashick
*Assistant Examiner* — Mollie Llewellyn
(74) *Attorney, Agent, or Firm* — Blake P. Hurt; Tuggle Duggins P.A.

(57) ABSTRACT

A barrel includes a number of wood slats that have an inner face, an outer face and side edges, grooves formed in the edges of the slats and keys that join the slats by engaging grooves in the side edges of adjacent slats, and end caps which are affixed to close the ends of the barrel.

16 Claims, 14 Drawing Sheets

(51) Int. Cl.
  *B65D 88/08* (2006.01)
  *B65D 6/36* (2006.01)
  *B65D 45/32* (2006.01)

(56) References Cited

U.S. PATENT DOCUMENTS

| | | | |
|---|---|---|---|
| 209,348 A | 10/1878 | Cutts | |
| 209,384 A | 10/1878 | Cutts | |
| 749,693 A | 1/1904 | Kremer | |
| 975,679 A | 11/1910 | Dupree | |
| 1,003,907 A * | 9/1911 | Hoffman | B65D 63/08 217/94 |
| 1,453,994 A | 5/1923 | Pfluger | |
| 1,583,257 A * | 5/1926 | Riggs | B65D 25/54 217/58 |
| 2,050,461 A | 8/1936 | Perry | 217/72 |
| 2,267,888 A | 12/1941 | Arnold | 217/72 |
| 2,289,245 A | 7/1942 | Dant | 99/277.1 |
| 2,289,405 A | 7/1942 | Beal | |
| 2,354,342 A | 7/1944 | Walker | |
| 2,649,124 A | 8/1953 | Merron | 144/309 |
| 3,306,489 A * | 2/1967 | Armbruster | B65D 1/16 220/592 |
| 3,329,174 A | 7/1967 | Pfeil | 138/141 |
| 3,456,827 A | 7/1969 | Wakeem | 217/72 |
| 3,462,038 A | 8/1969 | Morris | 217/72 |
| 3,991,516 A | 11/1976 | Cicero | 47/34 |
| 4,484,688 A | 11/1984 | Smith | 217/72 |
| 4,558,639 A | 12/1985 | Hojnoski | 99/277.1 |
| 4,813,565 A | 3/1989 | Croser | 217/88 |
| 5,537,913 A | 7/1996 | Vowles | 99/277.1 |
| 6,616,002 B2 | 9/2003 | Weil | 217/76 |
| 6,898,834 B1 | 5/2005 | Warren | 29/403.1 |
| D514,473 S | 2/2006 | Pendleton | D11/142 |
| 7,240,609 B2 | 7/2007 | Berecz | 99/277.1 |
| 7,284,476 B2 | 10/2007 | Roleder | 99/277.1 |
| 7,654,401 B2 | 2/2010 | Obergoenner | 217/65 |
| 8,381,926 B2 | 2/2013 | Kenealy et al. | 217/72 |
| D679,356 S | 4/2013 | Klotz | D22/103 |

FOREIGN PATENT DOCUMENTS

| | | | |
|---|---|---|---|
| EP | 0 139 529 | 5/1985 | B65D 8/04 |
| FR | 758204 | 1/1934 | |
| FR | 1078850 | 11/1954 | B65D 8/04 |
| FR | 2 587 268 | 9/1986 | B27H 5/04 |
| FR | 2587268 | 3/1987 | |
| FR | 2 795 015 | 6/1999 | B27H 3/00 |
| FR | 2795015 | 12/2000 | |
| FR | 2907703 | 5/2008 | B27H 3/02 |
| GB | 405547 | 2/1934 | |
| GB | 2 138 770 | 10/1984 | |
| GB | 2 297 077 | 7/1996 | |
| WO | 2008/053123 | 3/2008 | |
| WO | WO2008/053123 | 5/2008 | B27H 3/02 |

OTHER PUBLICATIONS

Tonnellerie Renaissance Process Renaissance Barrell information sheet; undated, admitted prior art.

PCT/US10/36777 corresponding to U.S. Appl. No. 12/788,991; International Search Report and Written Opinion mailed Jul. 2010; 11 pages.

* cited by examiner

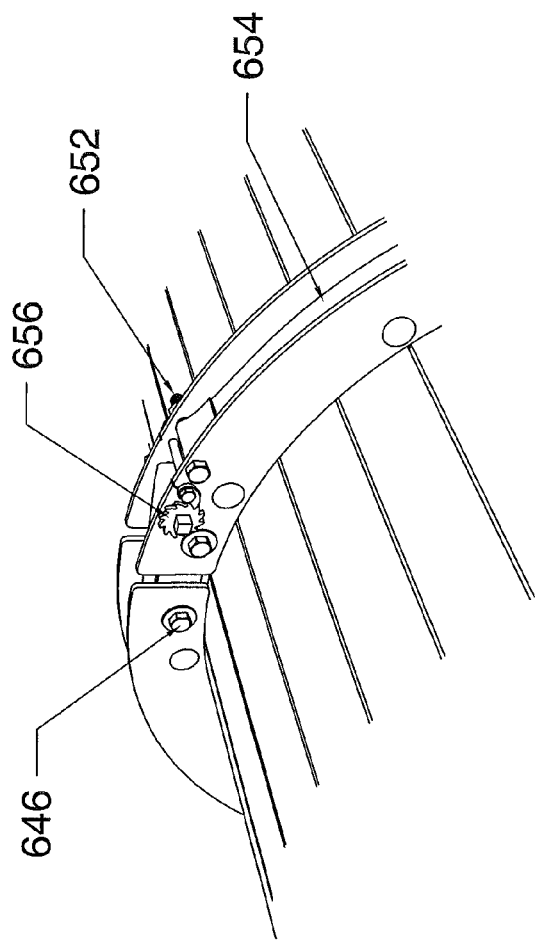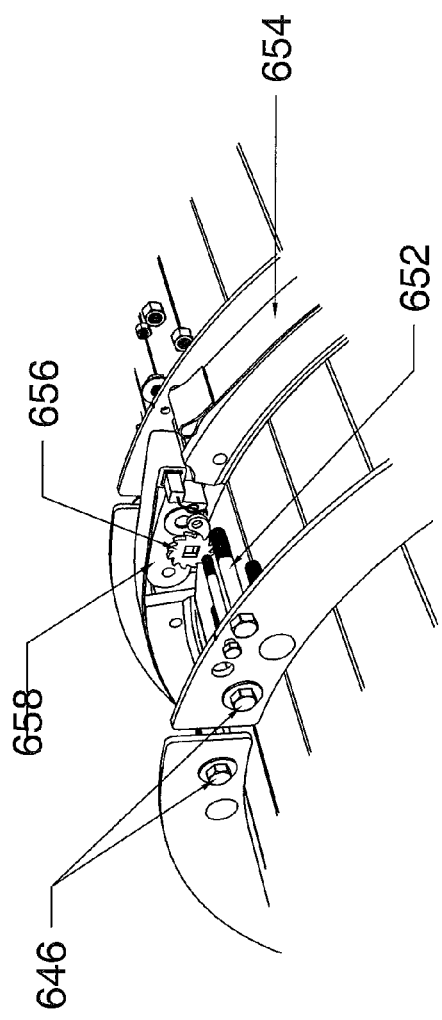
Fig. 22A
Fig. 22B

BARREL CONSTRUCTION

BACKGROUND OF THE INVENTION

The present application is a continuation in part of application Ser. No. 12/788,991 filed May 27, 2010 which was published as U.S. Patent Publication 20110000885-A1, and which issued Feb. 26, 2013 as U.S. Pat. No. 8,381,926, and which claims the benefit of the filing date of provisional application No. 61/182,317, filed on May 29, 2009.

Wine barrels have been around for hundreds of years and have been carefully crafted so that wine makers can use them to age wine, with the wood of the barrel contributing to the flavor of the wine by allowing the wine to absorb certain flavoring and components from the wooden barrel. This technique has been raised to a very carefully crafted art form with a particular species of wood being selected for various wines. For example, American Oak and French Oak provide different flavorings and a wine maker may pick one or the other depending on his or her objective for that particular wine.

In addition, the insides of wine barrels typically are toasted which further enhances the flavor transfer to the wine.

Thus, in barrel aging of wine, not only is the wine stored in the barrel, but some of the characteristics of the barrel are conveyed to the wine. As a result, although barrels can be reused, those characteristics become depleted to the point of where the barrel can rarely be used more than two or three times before having to be discarded or consigned to a much lower value use. This causes economic waste because the wood that goes into fine wine barrels is expensive and it would be advantageous if a barrel could be designed to allow the wood to be used for considerably more than two or three wine batches.

SUMMARY OF THE INVENTION

The present invention fulfills one or more needs in the art by providing a barrel made up of a plurality of wood staves that have an inner face of a first material selected for interaction with barrel contents, and an outer face of a second material selected for strength, the first and second materials being different. The staves have side edges, and grooves formed in the edges of the staves. Keys join the staves by engaging grooves in the side edges of adjacent staves, and end caps close ends of the barrel.

In some embodiments the staves are held together by the keys without additional peripheral binding. In other embodiments the staves are held together by the keys with peripheral binding, such as band segments in the form of arcs that partially surround the barrel and joints to bind ends of the arcs into a complete peripheral binding.

Preferably, each stave inner face is flat. Typically, each inner face is one species of wood and each outer face is of a material that is not the one species of wood and the inner and outer faces are laminated together.

In some embodiments a paddle affixed to one of the staves and extends within the barrel to increase the surface area for contact by barrel contents. In some cases the paddle is a different species of wood from the inside face.

Typically, the staves have ends and in some embodiments the outer face of each stave has a transverse groove near each end. A gasket is typically on the aligned ends of the assembled staves. The end cap may be affixed to the assembled staves and compress the gasket by a ring that has a cross section that terminates in a lower edge and an upper flange, the lower edge fitting into the grooves of the assembled staves and the upper flange holding the end cap against the ends of the staves. In some versions, the upper flange contacts an outside face of the end-cap and compresses the end-cap against the gasket and aligned staves. In some versions the upper flange has threaded openings at spaced locations around the ring and bolts through the threaded openings apply force on a force distribution plate on the end-cap to compress the end-cap on the aligned staves.

In some embodiments the end cap is affixed to the assembled staves by fasteners through the end cap into the keys or into the staves.

In some embodiments barrel has two portions and each is portion made up of a plurality of staves with flanges at portion edges, the flanges of adjacent portions forming complementary faces for connection to one another. Typically, a gasket is located between the flanges.

The keys can have a cross section selected from the group consisting of dovetail, cylindrical, oval, and lobed.

The inner face of the stave in some embodiments is charred quarter sawn oak, and in other embodiments the inner face of the stave is charred plain sawn oak. The inner face can also be other materials and species. Oak is preferred in wine barrels.

In another embodiment the invention can also be considered as a barrel including a plurality of flat wood staves that have an inner face of a first wood species selected for interaction with barrel contents, an outer face of a second material selected for strength, the first and second materials being different. The staves have side edges, and finger joints fainted in the side edges of the staves to fit into complementary finger joints in the side edges of adjacent staves, and a peripheral binding ring configured to clamp around the staves to hold the staves together.

The invention can also be considered as a barrel including a plurality of wood staves that are made of an inner facing of one species of wood and an outer facing of a material that is not the one species of wood, the inner and outer facings being laminated together. Each stave has have a flat inner face, an outer face and side edges, grooves formed in the edges of the staves and keys that join the staves by engaging grooves in the side edges of adjacent staves. A paddle that is affixed to one of the staves extends within the barrel to increase the surface area for contact by barrel contents, and end caps are affixed to the assembled staves.

The invention can also be considered as a method of assembling a barrel including forming staves by laminating together an inner facing of one species of wood and an outer facing of a material that is not the one species of wood and providing each stave with a flat inner face, forming keyways in sides of the staves, assembling the staves by joining adjacent staves with a key having a lobe configured to engage the keyway in the side of each adjacent stave while aligning ends of the staves to form a barrel sidewall; and after assembling the staves, capping the barrel sidewall with end-caps. Capping may include placing a gasket on each aligned end of the assembled staves, locating an end cap on each gasket, and passing fasteners through the end-caps and into threaded holes in the keys or in the staves.

Alternatively, capping can include placing a gasket on each aligned end of the assembled staves, locating an end cap on each gasket, and engaging a lower edge of an a ring with aligned grooves in the outer facings of the staves at one end of the staves and surmounting outside faces of the end-caps at the one end with an upper flange of the ring and compressing the end-cap against aligned staves at the one end using the upper flange of the ring. Compressing the end cap can include tightening the ring circumferentially to pinch the end cap toward the aligned staves. In another embodiment compressing the end cap includes tightening bolts through the flange of the ring against a force distribution plate on the end-cap.

The invention can also be considered as a method of aging wine including obtaining a barrel of flat wooden staves that have an inner face, filling the barrel with wine to age the wine in the barrel and thereby change the character of a depth of the inner faces of the staves, draining the wine from the barrel, disassembling the barrel to retrieve the flat wooden staves of the barrel, machining the inner faces to remove the depths with changed character, re-toasting the machined faces and reassembling the barrel for reuse.

In another embodiment, the straight staves have an inner face made of wood, an outer face, side edges and end faces, each stave has grooves formed in the edges of the staves that extend the length of the staves and an outer crosswise groove located on the stave length. Therefore, when the staves are assembled into a barrel, the outer crosswise grooves of the staves are aligned circumferentially around the barrel. Keys engage the grooves in the side edges of adjacent staves along substantially the entire length of the grooves. A binding band encircles the barrel and has a portion of the binding band residing in the outer grooves of the staves. End caps contact the end faces of the staves and close the ends of the barrel. At least one of the end caps may include a transparent end cap. In a variation, at least one of the end caps includes a transparent end cap and an opaque second end cap, mostly covering the transparent end cap, but leaving an inspection port, whereby the contents of the barrel can be viewed through the inspection port Preferably, the outer grooves include a female component of a dovetail and the binding band has a male component of a dovetail and interfits with the female component. The binding band may include upper and lower plates with a male dovetail component and a spacer between the upper and lower plates. The binding band may be formed in segments and multiple segments of binding band are assembled in an outer groove of the staves of a barrel and a further member connects adjacent segments. Preferably, the binding band segments meet at a double wide stave. A strap may be anchored in one binding band segment, encircle the binding band segments and terminate at a ratchet that can be actuated to exert tension on the strap, squeezing the binding band segments radially inwardly.

The end cap may be held to the barrel with a retainer assembly that includes an end ring and a supplemental ring spaced apart by spacers. The end ring has an inner diameter small enough to bear against the end cap, and bolts circumferentially located between the spacers allow compression of the retainer assembly to a binding ring on the barrel.

BRIEF DESCRIPTION OF THE DRAWINGS

The invention will be better understood by a reading of the Detailed Description of the Examples of the Invention along with a review of the drawings, in which:

FIG. 22A is a view of the embodiment of FIG. 19, showing how adjacent binding band segments are unified;

FIG. 22B is an exploded view of the embodiment of FIG. 22A; and

DETAILED DESCRIPTION OF EXAMPLES OF THE INVENTION

Figure 1:
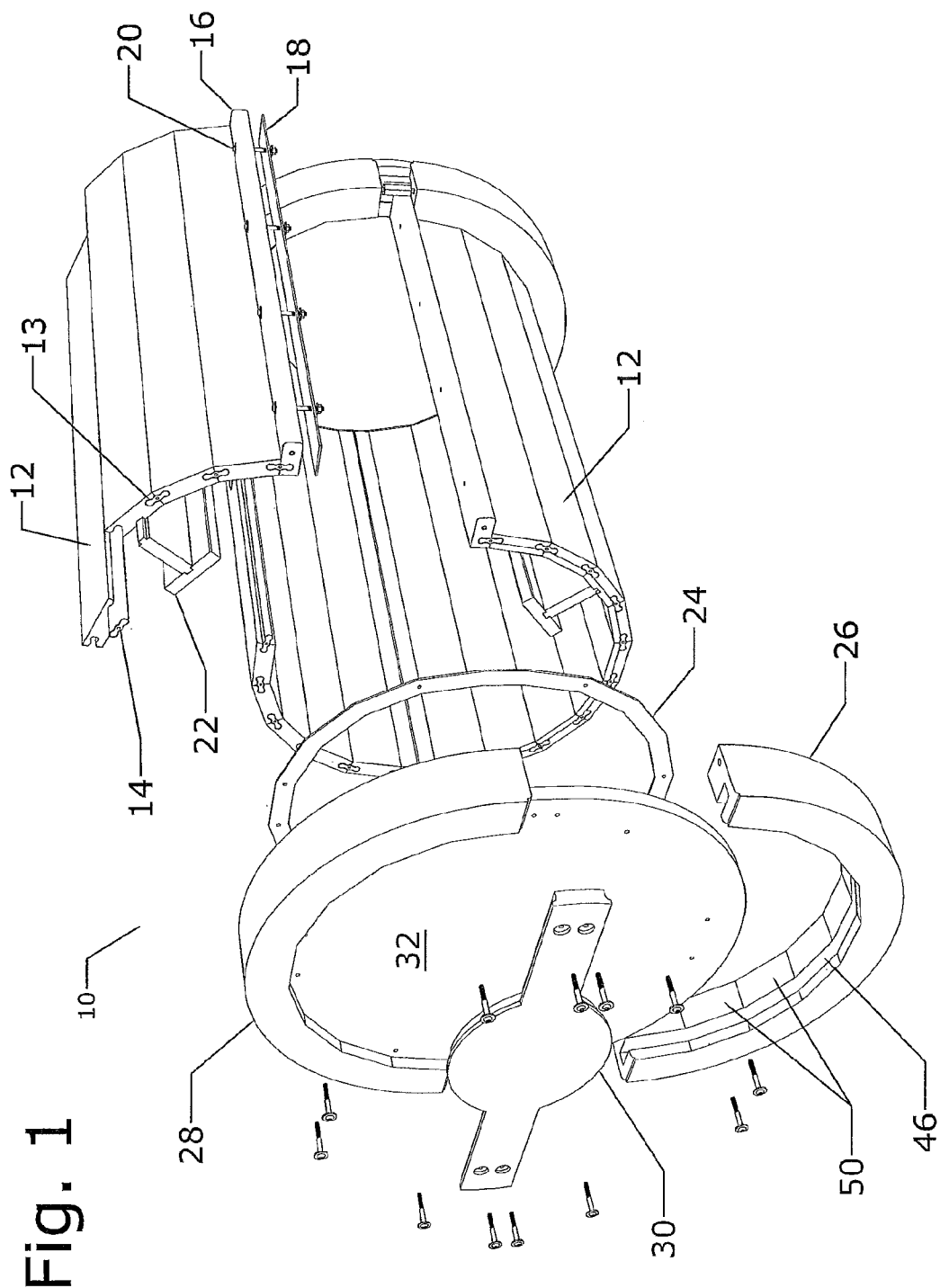
FIG. 1 is an exploded view of a barrel in accordance with an embodiment of the invention.

As seen in FIG. 1, an exploded barrel view is shown. The barrel is made up of a plurality of staves 12 which are generally straight, so that the sidewall of the barrel ultimately becomes nearly cylindrical (actually, the perimeter is a polygon), rather than a conventional bowed barrel shape. The plurality of staves 12 have keyways 13 formed in their sides, so that adjacent staves are held together by a key 14 configured to fit into the adjacent keyways 13. A plurality of the staves 12 are joined in this fashion to form generally half of the cylinder. To each end of the half cylinder is then affixed a flange 16 assembled with its own key, as seen in FIG. 1. Thus, each of the two cylinder halves has as its most extreme longitudinal edge a flange 16, so that the two half cylinders can be brought together with the flanges 16 abutting with an intervening gasket 18. Preferably, the gasket 18 is of a material which is compatible with the use of the barrel, particularly wine making The flange and gasket have a plurality of aligned holes, so that bolts 20 and nuts can be passed through the aligned holes and bind the flanges and thereby complete the cylinder of the barrel.

End gaskets 24 can then be applied to both ends of the cylinder and end caps 32 positioned over the gasket with holes aligned in the key 14. Bolts 36 are then bolted into the aligned holes to cap the barrel with the cap 32. Two additional half hoop elements 26, 28 can be affixed to the perimeter of the end cap 32. A groove 46 formed in the inside of the hoop components 26, 28 receives the edge 48 of the end cap 32. A plurality of faces 50 is formed on the inside of the hoop 28 to engage the outside surfaces of the assembled staves 12. As the two hoop portions 26, 28 are brought together (discussed below) the faces 50 engage the outer faces of the staves 12 to reinforce the barrel end.

A component 30 can be affixed to the end cap 32 to provide a label surface and handle to aid in handling of the assembled barrel.

Referring now to FIGS. 2a through 2g, 3a through 3f and 4a through 4g, various alternate stave and keyway designs can be seen. FIG. 2a shows a stave formed partly of solid oak 60 mated to a polymer component 62 and having a trapezoidal keyway. FIGS. 2a, 2b, and 2c show alternate combinations of oak and polymer with rounder, lobed keyways. FIGS. 3a through 3d show cooperating keys for the keyways of FIG. 2a through 2d, respectively. FIGS. 4a through 4d show flange component 16 with keyways formed to receive the respective keys 14 of FIGS. 3a through 3d. FIGS. 2e, 3e and 4e and 2f, 3f and 4f, respectively show keyways with non-lobed keys. FIG. 2g shows a finger joint construction and FIG. 2h shows an alternate finger joint construction.

Figure 5:
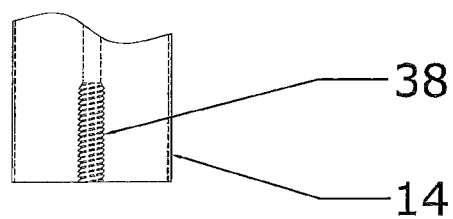
FIG. 5 is a partial sectional view of an end of a key.
Figure 6:
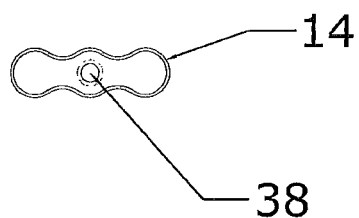
FIG. 6 is a view of a key like in FIG. 3.

As seen in FIGS. 5 and 6, the key 14 may be provided with a center hole 38 that is tapped for the end cap 32 to be attached. FIG. 5 shows where the threading of the center hole 38.

Figure 7:
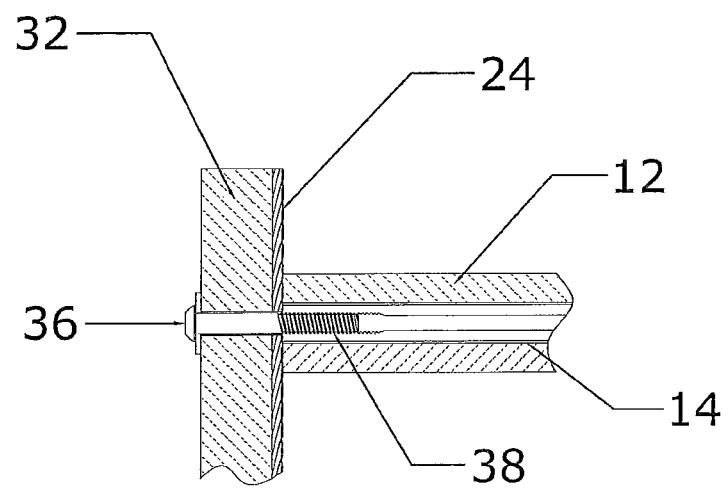
FIG. 7 is a sectional elevation view showing connection of the barrel top to a key.
Figure 8:
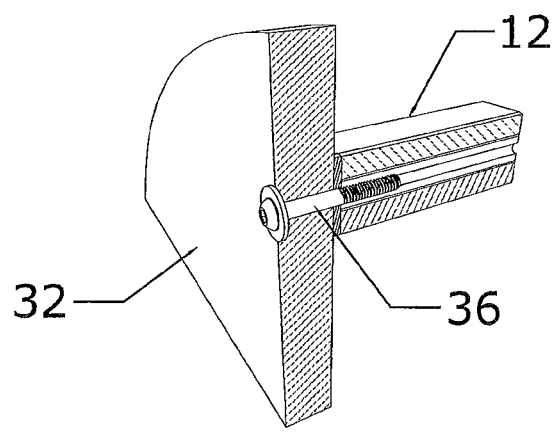
FIG. 8 is a sectional perspective view showing connection of the barrel top to a key.

FIGS. 7 and 8 show a stave 12 with inserted key 14 tapped at 38. The end of the stave 12 abuts the gasket 24 and is compressed by the end cap 32 and held in place by the bolt 36 passing through the hole in the end cap 32 and gasket 34 and engaging with the threads 38 within the key 14.

Figure 9:
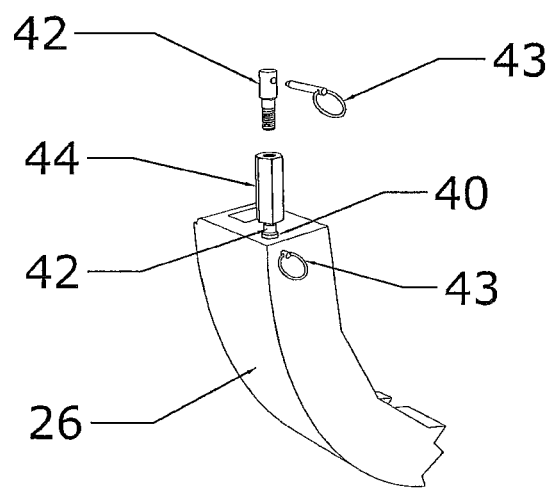
FIG. 9 is a view of the connectors used to close hoop ends on the barrel.

Referring to FIG. 9, an end of a hoop 26 can be seen having an inserted threaded unit 42 held in place by a retainer 43. A second retainer 43 and threaded unit 42 are shown in FIG. 9 for placement in the abutting hoop end, not shown. A ferrule 44 is provided with alternate ends having female threads to match the male threads of units 42 that are positioned in the hoop ends. Rotation of the ferrule 44 draws the two hoop ends together by engagement with the opposed threads of the units 42.

The staves can be charred or toasted prior to assembly into the barrel. Preferably, the individual staves can be passed under an infrared heater which causes sufficient heating and can be controlled to achieve the desired toasting effect. After usage of the barrel to age wine, the barrel can be partially disassembled by removing the end caps and unfastening the flanges 16 to aid in cleaning or re-toasting. Given the uniform faces and straight configurations inside, the barrel can be machined with a CNC router to simply shave off the consumed inner face of the barrel. The staves can be passed through an infrared toaster to toast the barrel surface anew, and then the barrel can be reassembled. In addition to infrared toasting, the design allows for other alternatives such as conventional toasting methods and other radiant energy alternatives.

Figure 2:
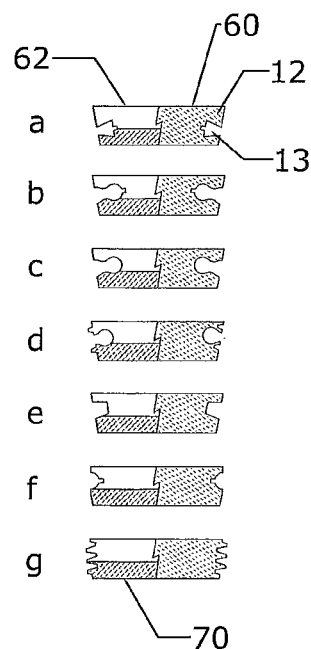
FIG. 2a-2g is a series of sectional views of various stave embodiments.

As indicated in the discussion above regarding FIG. 2, the staves can be configured with a number of materials, although preferably the inner portions of the barrel including the gaskets to which the contents of the barrel will be exposed will be selected for their cooperation with the barrel contents (typically wine). FDA-approved food grade polymers are known and may be suitable for gasket and key use. For use of the barrel for aging wine, it is expected that any interior face will be white oak, although other materials for desired effects can be used.

Figure 3:
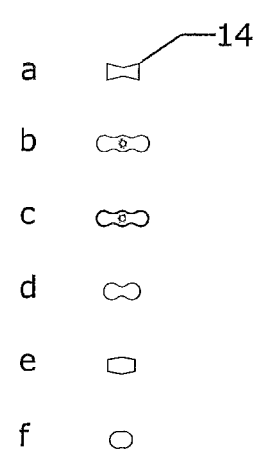
FIG. 3a-3f is a series of sectional views of various key embodiments.
Figure 4:
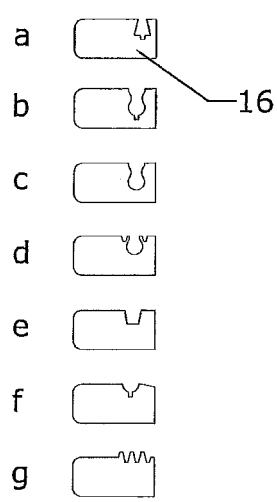
FIG. 4a-4g is a series of sectional views of various flange embodiments.

The invention also provides for the possibility of optional paddles 22 to be mounted using a similar keyway and key connection to those shown in FIGS. 2 through 4. Since the paddles 22 are not structural, they can be selected for their desired effect on the barrel contents. In particular, it is contemplated that red oak or other species might be used to provide alternate flavoring components to a wine stored in the barrel.

Figure 10:
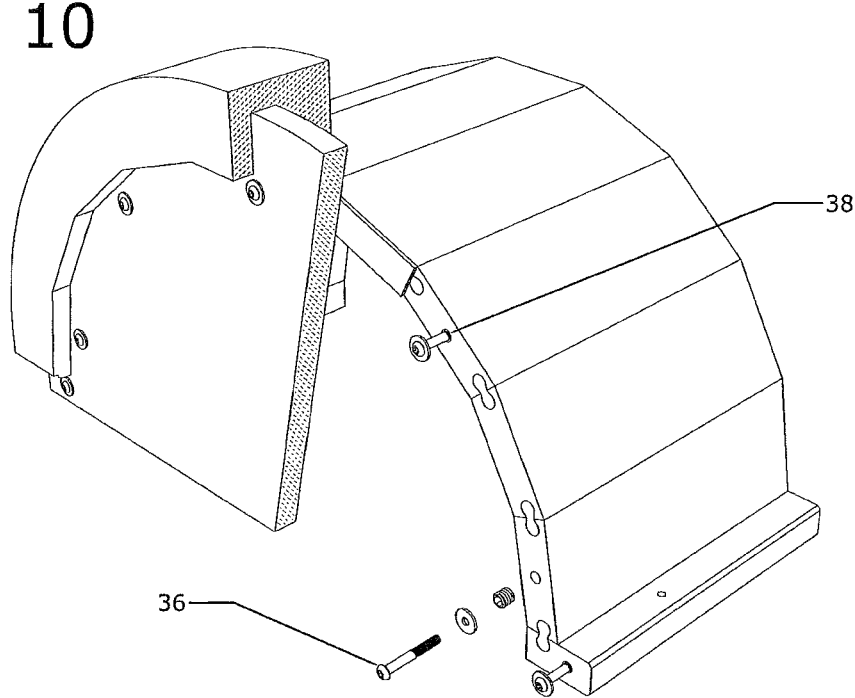
FIG. 10 is a view of another embodiment.

As see in FIG. 10, alternate embodiments contemplate the possibility of bolts 36 passing into the stave, rather than the key, so that the hole 38 is located in the stave, rather than the key.

Figure 11:
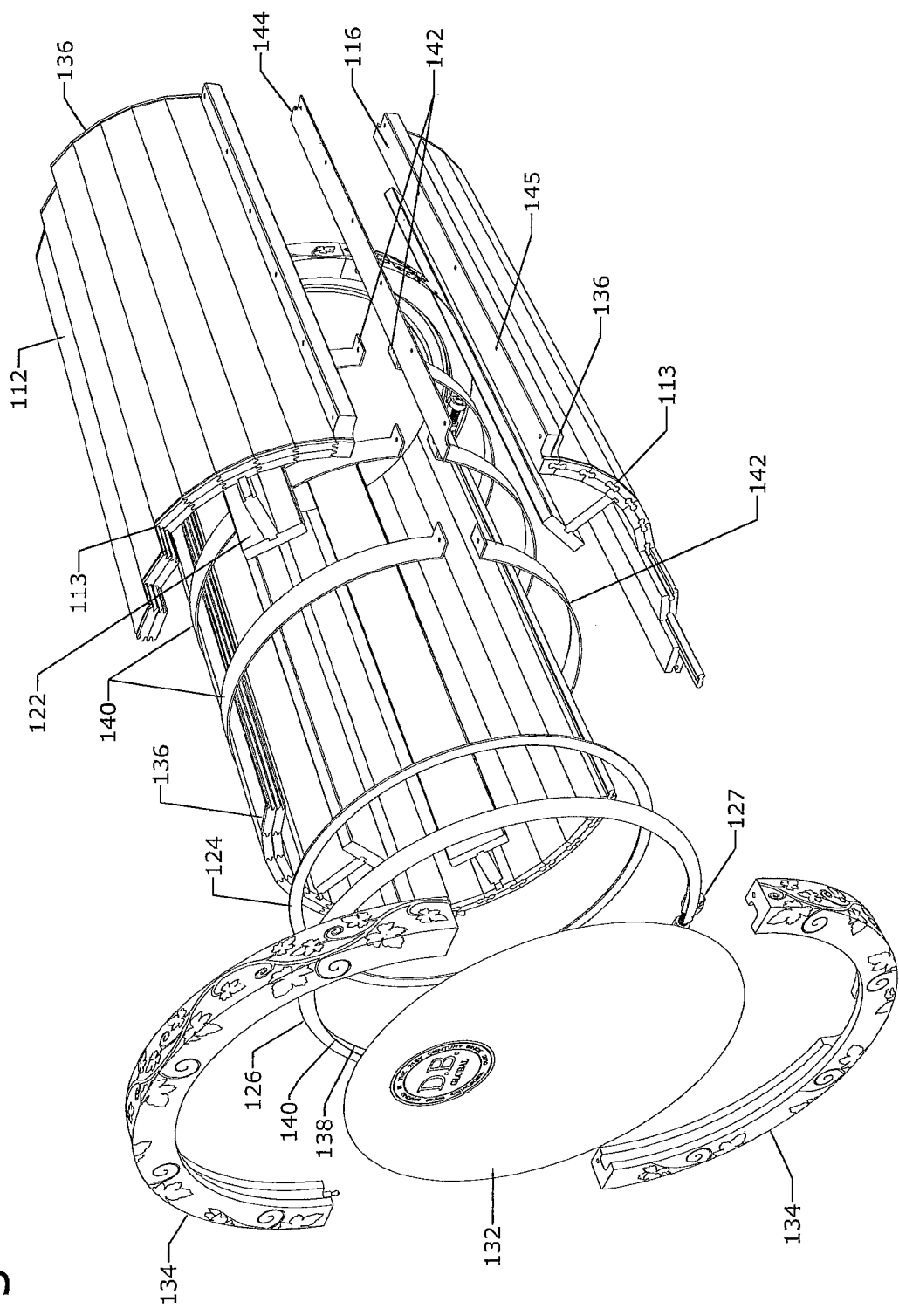
FIG. 11 is an exploded view of another embodiment.

FIG. 11 shows another embodiment. In this embodiment and in the embodiment of FIG. 12, similar materials are provided with the same reference numeral, augmented by 100. Thus, in FIG. 11, staves 112 are provided with side edges 113, which can be in the form of keyway, seen in the lower portion of the figure. Also, as shown in the connections between the adjacent staves in the upper portion of FIG. 11, the side edges can be finger jointed together. The various joint or key combinations shown in FIGS. 2 through 4 can be used. However, in particular, in the embodiments of FIGS. 2e, 2f and 2g can be used because the joints in the embodiment of FIG. 12 do not need to provide structural and bursting strength.

Each stave 112 is provided with an outer transverse groove 136 on both the top and bottom of the stave. The grooves 136 of the adjacent staves line up to make a continuous groove around the perimeter of the barrel. As before, the paddles 122 can be provided internal of the barrel. Also contemplated is that the species of the wood of paddles 122 can differ from the stave in order to achieve additional flavoring aspects. The staves are joined together as before, with additional staves having flange components 116, as before.

Two abutting flange components are separated by a gasket 144. The assembled barrel then is encircled by bands 140 with their respective abutting ends 142 which engage onto the flanges 116. The bands 142 are lined up so that their respective holes in their flanges 142 align with holes 145 in the flanges 116. The bands are bolted into place through the aligned holes in the flanges to provide circumferential strength to the barrel. This means the joints between coupling staves are not load bearing and can simply be the configurations shown in FIG. 2e, 2f or 2g. Of course, the other key configurations shown can also be used in this embodiment. The end cap 132 is coupled to the assembled tops of the staves with an intervening gasket 124. Surrounding this assembly is a conventional barrel closure band 126 of a circular shape, but with a somewhat parabolic cross-section. As a result, a lower edge 138 of the band 126 engages with the assembled groove 136 of the tops of the staves and the upper edge 140 of the band 126 acts as a flange that covers and holds down the lid 132 of the barrel. The band can be cinched closed by tightening a nut and bolt assembly 127 seen in better detail in FIG. 12.

A supplemental decorative element 134 can be bound around the band 126 to enhance the appearance of the barrel assembly. The foregoing discussion of the assembly onto the top of the center of FIG. 11, also applies to the barrel bottom shown at the right hand side of FIG. 11, in analogous form.

Figure 12:
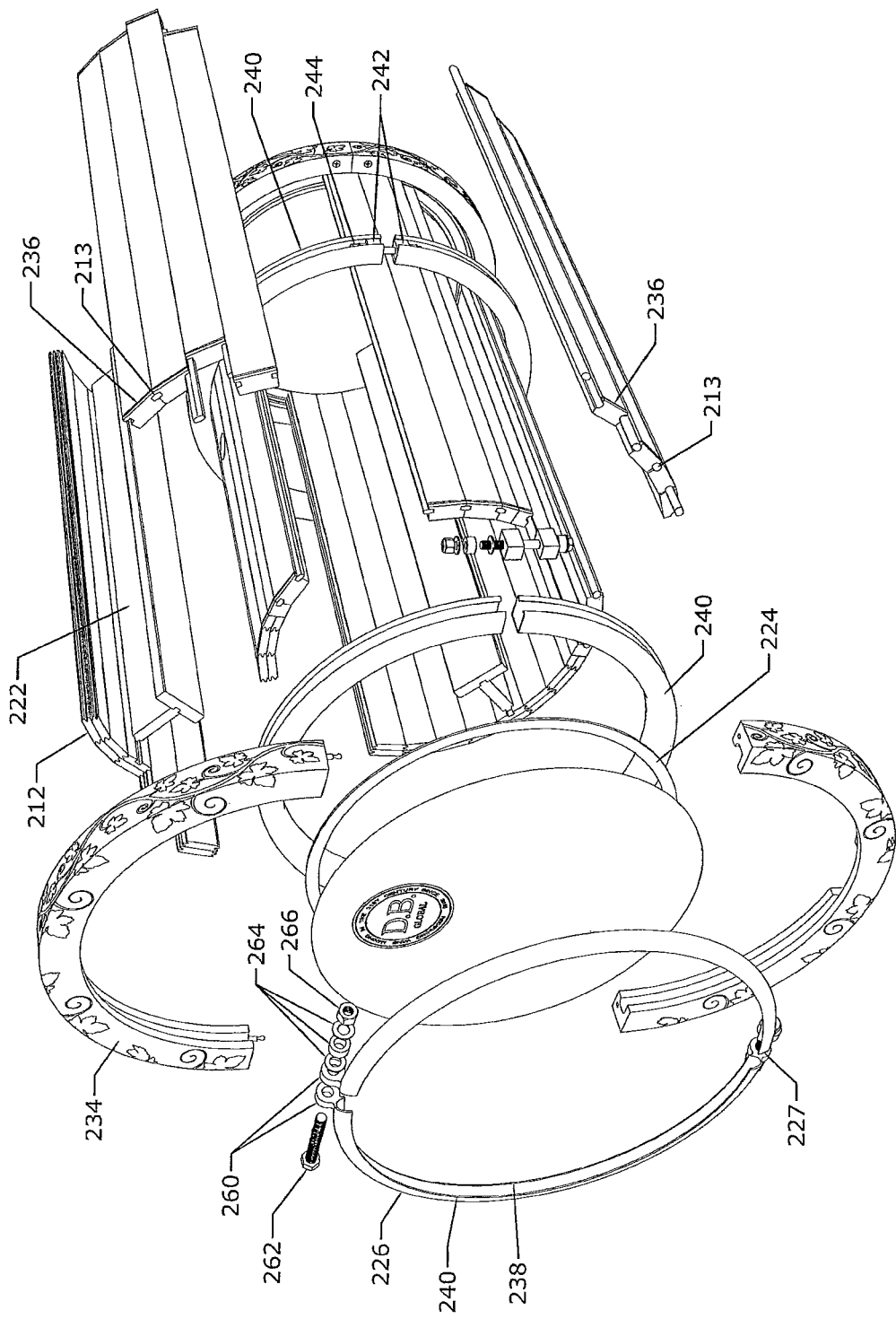
FIG. 12 is an exploded view of another embodiment.

FIG. 12 shows an exploded view of another embodiment. Various staves 112 can be used with edges having the shapes shown in FIG. 2, as discussed above. Similarly, each stave has a groove 236 in either end of the outer face to receive the edge 238 of the closure band 226 while the upper flange or edge 240 covers the end cap 232 which has been assembled on to the tops of the assembled staves of intervening gaskets 224. As seen in FIG. 12, the band 226 can be provided in two halves, with each half having on each end a loop 260, so that openings in the two loops align to receive a bolt 262. The bolt that has passed through the tube then receives a series of washers and compression elements 264 and a nut 266 which can be tightened to bring the band 226 to closure, with the band 238 fitting tightly into the grooves 236 of the tops of the staves.

Another band, of a U-shaped crossed section 240, can be provided, typically at two spaces along the height of the staves and have bearing blocks 242 fixed in their ends. These are bound together with a bolt arrangement 244 much like the bolt arrangement 262 through 266 discussed above. As with the embodiment of FIG. 11, a decorative component 234 can be used to hide the band 226 and its associated closure elements 227.

Figure 13:
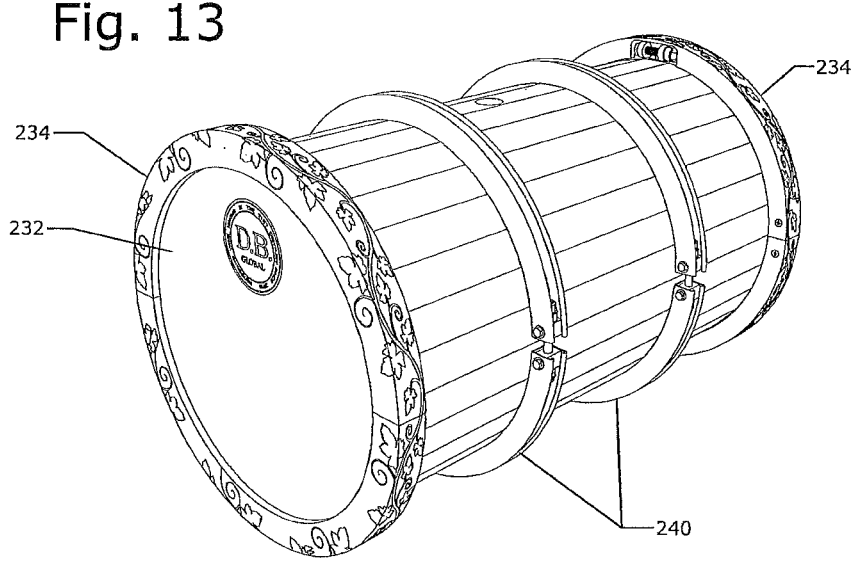
FIG. 13 is a perspective view of an embodiment with decorative cowling.

FIG. 13 shows an assembled barrel having its decorative closure 234 and end cap 232 along with the various staves 212 and binding bands 240.

As will be appreciated, the staves are all identical and are all flat and straight. After the barrel has been used and its flavoring components depleted, the barrel can be disassembled and each stave can be machined to remove the inner face of the slat, where the flavoring elements have been depleted. This provides a new wood face exposure. The stave can be re-toasted and then the barrel can be reassembled, providing like-new performance.

In another embodiment, grooves such as the grooves of FIGS. 2a, 2b, 2c and 2d can be provided with the barrel assembled with those grooves abutting one another with no installed key. Then, a liquid polymer such as silicone can be injected and allowed to cure in place to form the closure between adjacent staves. This is particularly useful in the half barrel component arrangement such as shown in FIG. 11 where the flanges 116 are bolted together in the final closure of the barrel. Disassembling a barrel made of this configuration, thus leaves two half barrels. The silicone sealant has enough resilience, that the barrel can be flexed open to expose each stave for removal of its inner coat and re-toasting without having to disassemble the entire barrel. The silicone polymer may be expensive, so fillers for to the keyways to provide strength yet cooperate with the silicone to complete the joint are contemplated within the scope of the invention.

As noted, preferably each stave is laminated with the better quality wood on the inside face of the stave and a lesser quality wood, or perhaps even a plastic or other material on the outer face of much less cost. However, the invention may also be carried out with solid wood staves that are all one species. The precision making of the staves can be accomplished with CNC machines.

Figure 14:
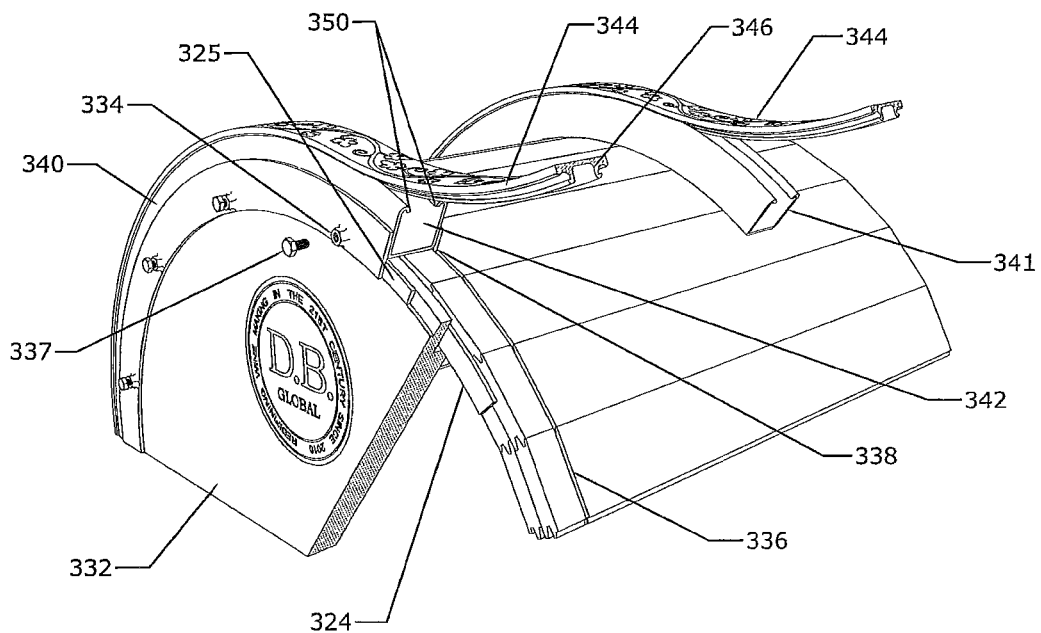
FIG. 14 is a perspective view of another end closure embodiment partially broken away.

FIG. 14 shows another closure for the barrel end. In this case the barrel end cap 332 is clamped in position by a closure ring 340 with an intervening gasket 324. A ridge 338 on the ring 340 engage grooves 336 in the ends of the barrel staves. In this case, the ring 340 has integral with it a plurality of threaded fittings 334 which can receive bolts 336. The force applied by the bolts 337 is distributed over the perimeter of the end cap 332 by intervening steel plate 325.

The ring 340 is formed with an internal channel and inwardly turned edges 350 which in turn engage mating hooks 346 formed on an extrusion 346 covers the opening in the ring 340 and provides a decorative cover. As can be seen, the same decorative strip can be used for the ring 341 intermediate of the barrel length.

Figure 15:
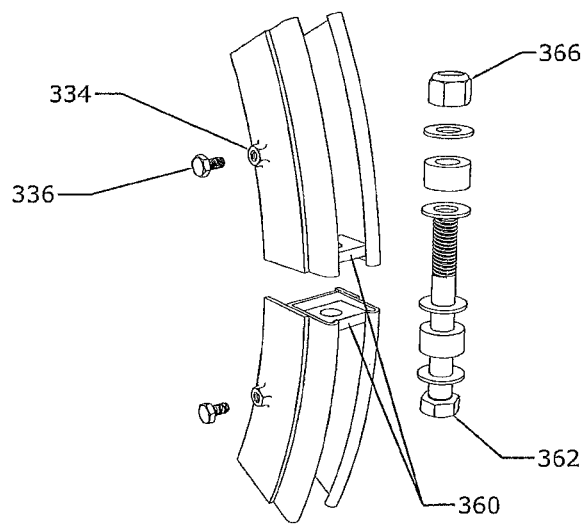
FIG. 15 is an exploded view of the closure of FIG. 14.

FIG. 15 shows the closure of the ring 340 in more detail. Two abutting ring ends are provided with retainers 360 which can be cinched together by nut and bolt assembly 362 through 366, much like the nuts and bolts used on the ring closures of FIG. 12.

Figure 16:
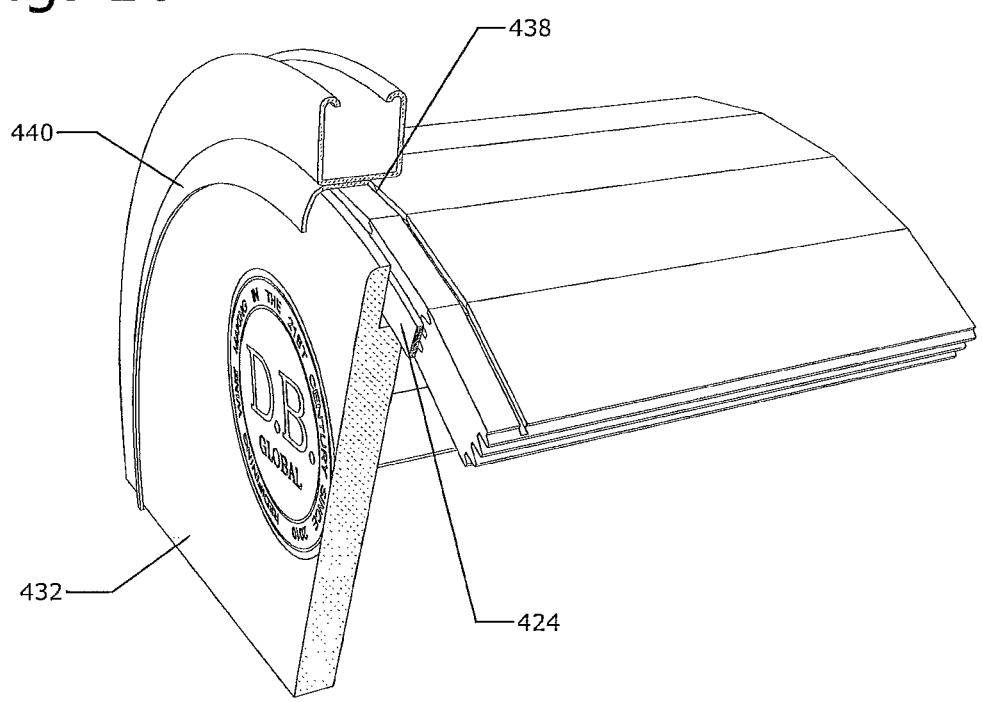
FIG. 16 is a view of another end closure embodiment partially broken away.

FIG. 16 shows an embodiment like before, but with a ring 446 having a ridge 438 that fits in the aligned groves in the tops of the staves. Ring 446 also has a flange 440 that bears against the top of the end cap 432. circumferential tightening via a bolt and nut arrangement like the one shown in FIG. 15 causes the flange 440 to bend the end cap tightly on the gasket 424 and on the staves.

The barrel design allows the volume of the barrel to be modified rather easily. Since the staves are flat, once the stock material is made up, it can be cut to length to make up the barrel height. That is, if the staves are cut longer and assembled into the barrel, the enclosed volume will increase. Since the staves are flat, all that need be done to achieve a 50% increase in volume is to make the staves 50% longer. For example barrels from 10 gallons to 69 gallons could all have the same diameter and merely be longer or shorter in length. Other proportions work the same. With conventional curved staves, determining the proper proportions for the staves to change the barrel volume is much more complicated.

Conventional barrels often have a size of 59 gallons. To match that volume, one can determine a most efficient number of staves, based on available stave material and came up with roughly 2½" wide staves. Convention staves are roughly 4-5 inches wide. The narrower staves are generally less expensive, and the invention allows the use of narrower staves. Material cost (primarily French White Oak) is a large percent of the overall cost of the barrel. When cutting the staves, the yield from rough board to finished stave will have a major impact on the cost and narrower widths improve yield. At some break point in width, it may even be use what are called "shorts" and "narrows" that are the same quality of wood but do not meet NHLA standards for FAS grade wood because of their length and width.

Figure 17:
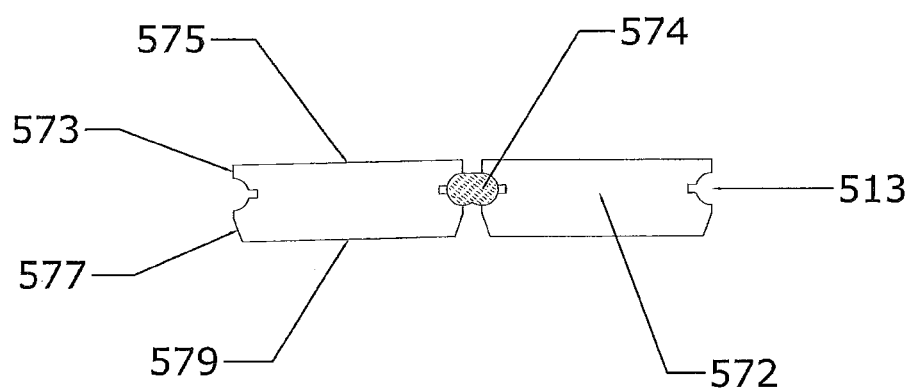
FIG. 17 is a schematic view of two staves in another embodiment in an aligned configuration.
Figure 18:
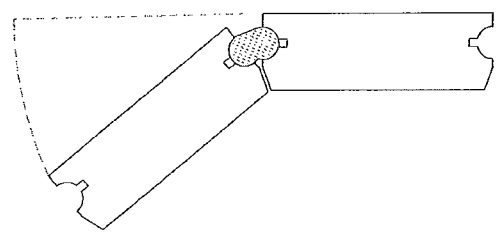
FIG. 18 is a schematic view of the two staves of the embodiment of FIG. 17 in an angled configuration.

The volume can also be increased by increasing the circumference of the barrel, while still using the same width and length of staves. One common stave can work for different diameter barrels. Again, this is not true for traditional barrels. The staves 512 seen in FIGS. 17 and 18 permit this flexibility. As seen in FIG. 17, two staves 512 with their intervening key 514 are positioned in a nearly aligned configuration, part of a barrel with a very large circumference. FIG. 18 shows that the same two staves 512 and key 514 can come together in an angled configuration, consistent with a barrel of smaller circumference. Thus, the number of staves and keys used to make up the barrel sidewall can be varied to achieve a desired circumference, and varying the circumference using staves of a constant length varies the contained volume. Of course, both the numbers and lengths of the staves can be varied, if desired.

The shape of the edge 513 of the stave 512 and the key 514 cooperate to make secure, liquid-tight connections at a range of angles (unlike many conventional staves which would leak if the angle of approach to the adjacent stave were varied), and the range of angles will be determined by the number of staves assembled to make up the barrel circumference. The side edge 513 of each stave has an outer portion 573 that is essentially perpendicular to the outer face 575 and an inner portion 577 that forms an obtuse angle to the inner face 579. The keyway is formed in the outer portion 573 of the side edge 513.

For a given barrel circumference of C, the barrel can be made up of a range of combinations of N number of staves and keys, if the staves have a width of W and the keys add k to the width, as long as C=N×(W+k). That is, the invention permits not only the stave length to be varied, but also the number of staves and their widths, in order to achieve a desired volume. Of course, the barrel heads, head gaskets and rings are to be varied to match the diameter of the barrel selected.

While the laminated staves described above are presently preferred, solid wood staves are within the broad scope of the invention.

The half barrel design held together with keyways has the benefit of reducing the number of parts to assemble into a barrel. Considering the possibility of a winery doing the final assembly, simply assembling the two halves is relatively straightforward and can be accomplished quickly. The two barrel halves can be nested together for efficient shipping, efficient cleaning and efficient re-shaving/toasting.

Figure 19:
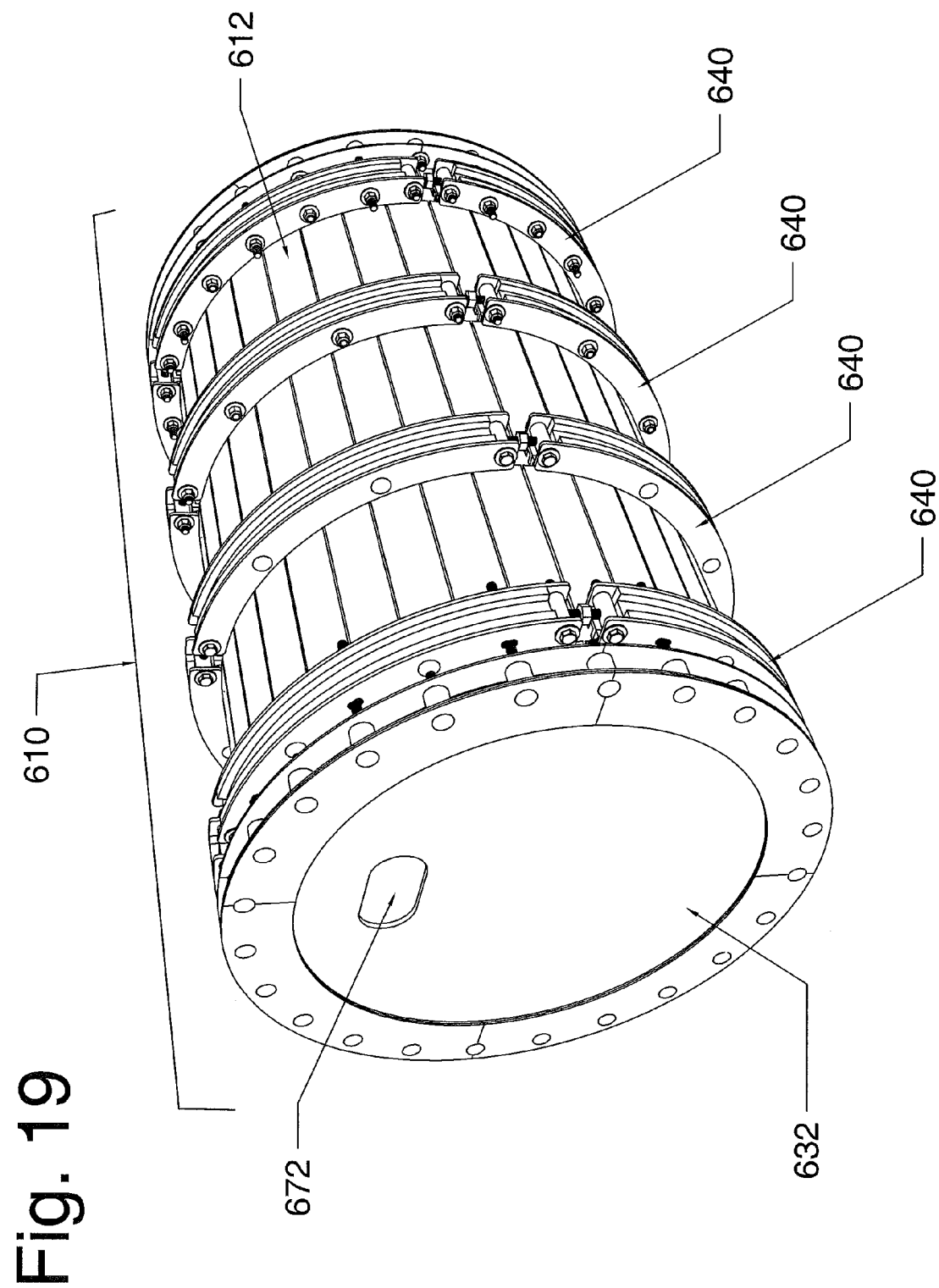
FIG. 19 is a view of another embodiment.

FIGS. 19-23 show other possible modifications of the barrel as carried out in an embodiment 610. FIG. 19 shows an end view of the barrel, with its staves 612 and endcap 632. The endcap 632 is held in place by a retainer assembly (shown in more detail in FIG. 23). The endcap 632 is shown having a cutout inspection port so that an inner, transparent plastic or glass end cap 672 is visible. The transparent end cap covers the end of the barrel, and its periphery is sandwiched between the endcap 632 and the ends of the staves. The use of a transparent end cap provides a couple of benefits. First, the barrel contents can be viewed through the inspection port, to allow monitoring. Second the transparent material can be made to be much smoother than the wood of the endcap 632, making a reliable seal with the ends of the staves easier. If desired, a hole can be provided in the transparent material, to allow contents to be added or withdrawn, and then closed in a reliable fashion. The wooden covering endcap 632 provides esthetics, keeps out light, and provides an outer shell that is less fragile that the transparent material. To compensate for the lost wine-to-wood contact area arising from the glass substitution, the paddles 22 described above in reference to FIGS. 2-4, or other geometric modification of the barrel, can be used.

Figure 20:
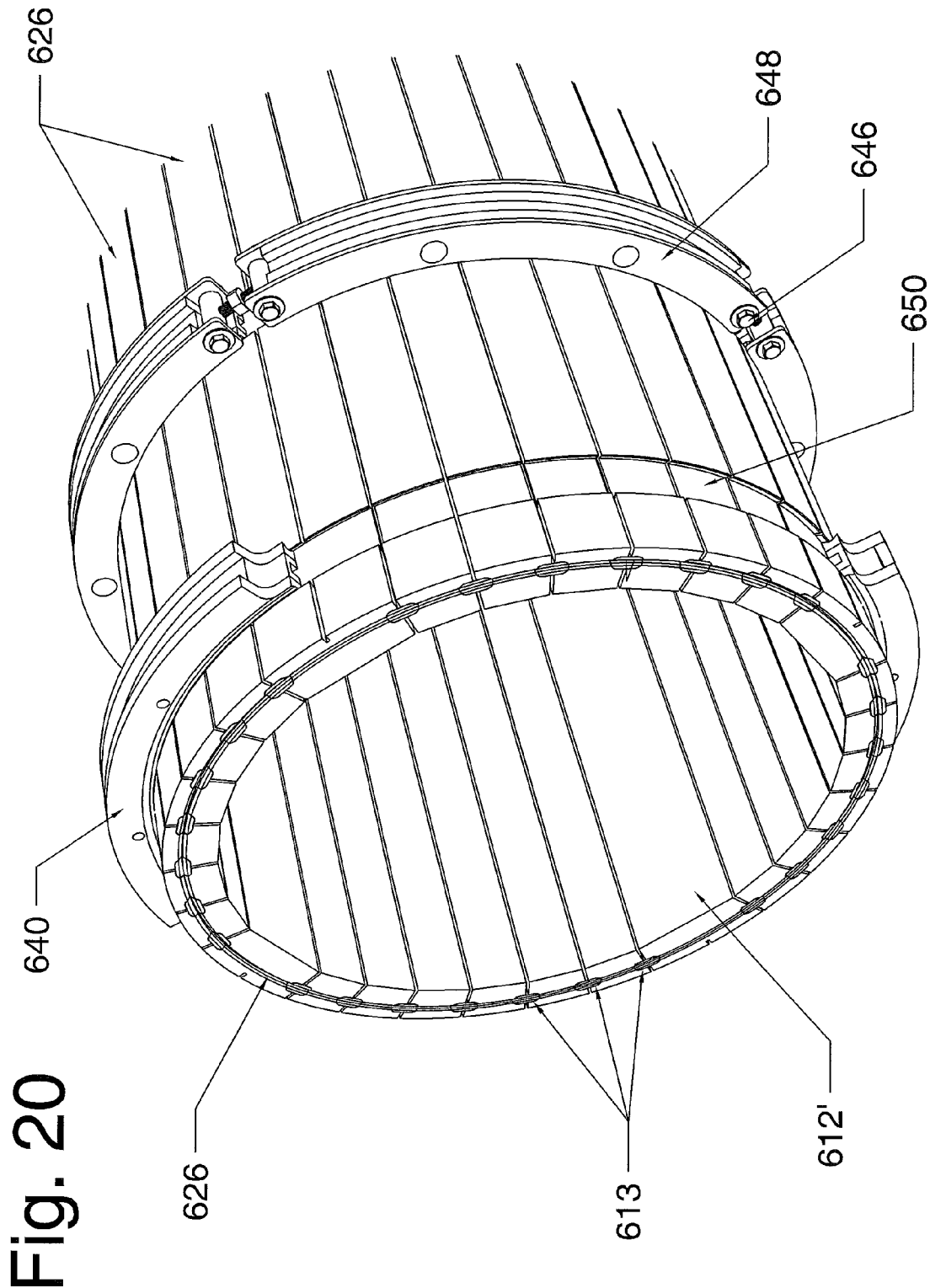
FIG. 20 is a view of the embodiment of FIG. 19, from the other end of the barrel and with the endcap removed.

FIG. 19 also shows four rows of binding bands 640 along the outer sides of the barrel. FIG. 20 provides a different perspective on the bands 640 and shows them mounted at crosswise grooves 650 formed in the outer faces of the staves. The crosswise grooves are formed in the staves with undercuts, resulting in the groove having the female component of a dovetail. As see in FIG. 21, the grooves are filled with an assembly made up of upper and lower plates 642 with outer male dovetail components and a spacer 644. In the view of FIG. 20 the outer two binding bands also have outer steel plates 648. The plates 648 do not reside in the groove. Their inner curvatures match the outer curvature of the assembled staves 612. The staves are placed adjacent one another, aligning the stave-width segments of the grooves 650 into a continuous groove. The upper and lower plates 642 are inserted into the continuous groove, making the dovetail connection, and then the spacer 644 is positioned between the plates 642 to hold them in contact with the groove. The steel plates 648 are added and then nut and bolt assemblies 646 are inserted to hold these components together.

Preferably, the binding band is formed in segments and multiple segments of binding band are assembled to encircle the barrel. In a preferred embodiment, enough staves are assembled with their binding band components to form a quadrant of the barrel sidewall (i.e. with four binding band segments for one binding band). FIG. 20 shows that each quadrant of the barrel has a stave 612' that is of double width, and the binding band quadrants meet at the double wide stave, so that radial rigidity is provided for the barrel, either at a double stave or a binding band quadrant, all the way around the barrel.

The binding bands serve two useful purposes. By engaging with the groove in the sidewall of the staves, they prevent axial movement of the staves. If the grooves are formed at precise locations along the length of the staves, this makes the stave ends all be located in a common plane, so that an end cap can be sealed to the barrel end to prevent leakage from the ends of the staves. The binding bands also provide radial compression, forcing the joints of the staves into tight, intimate contact to prevent leakage between the staves. The precise location of the grooves along the length of the stave can be accomplished with CNC machinery. In fact, a preferred method of assembly places the staves of a quadrant together in a fixture or jig, where they are assembled in the quadrant form, the ends are cut in common and the grooves are cut in common, assuring that the staves of the quadrant have their grooves all at the same place. While the assembled grooves are in the fixture, a gland 626 (see FIG. 20) can also be cut in the stave ends to hold an O-ring to make the end cap seal.

FIGS. 22A and 22B show a way to connect adjacent binding bands. Pivoting members 658 positioned in the space between two of the plates 642 (with only shortened versions of the spacers 644, to allow room for the pivoting member 658) extend from one end of a binding band quadrant and can be pivoted down into a similar space between the plates 642 of the adjacent binding band quadrant. By having the pivoting member 658 engage between the plates 642 of two binding band quadrants, those binding band quadrants are made coplanar and therefore, their stave ends are coplanar. Alternatively, the binding band segments can be connected with ferrules, as in the embodiment described above.

Figure 21:
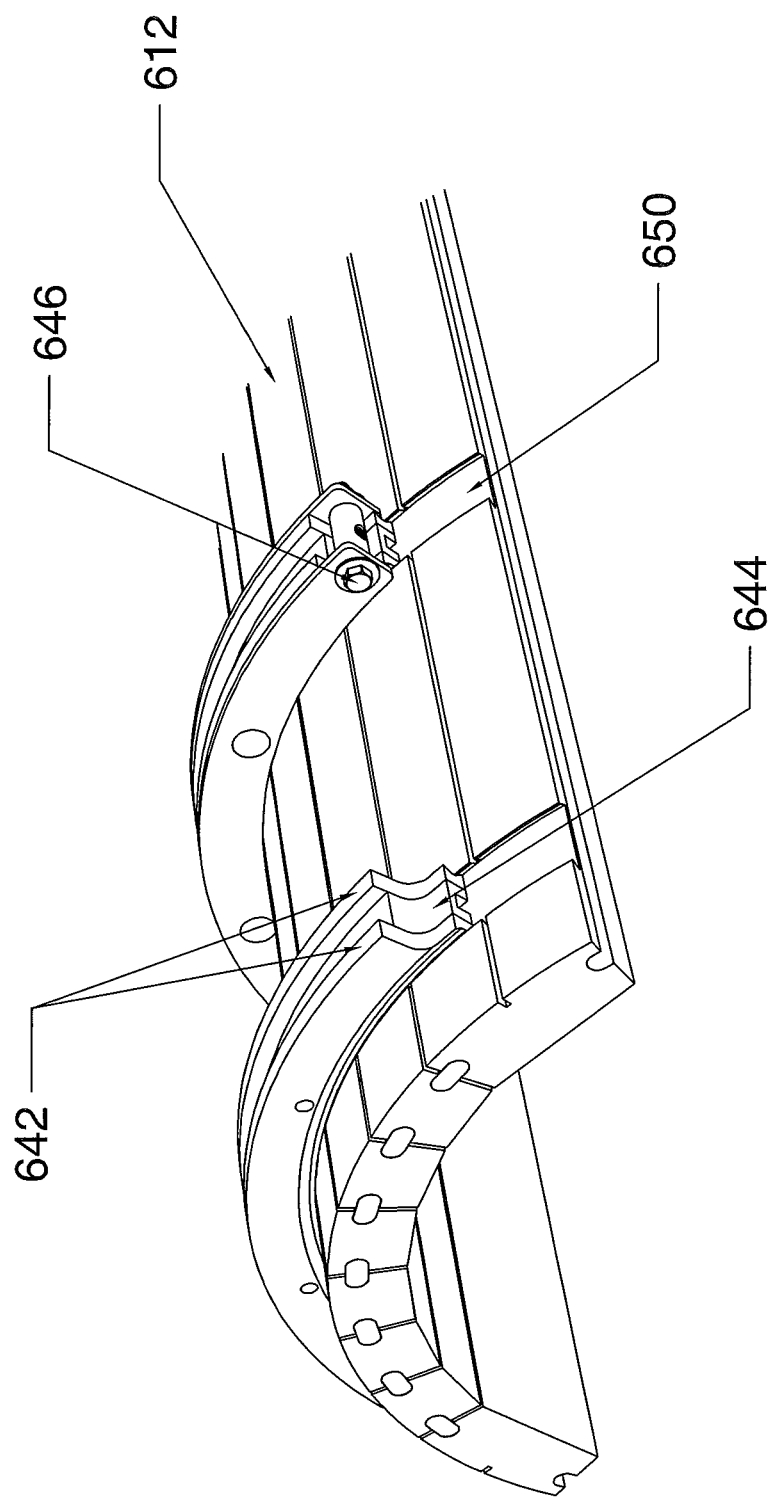
FIG. 21 is a view of the embodiment of FIG. 19, showing a close up of a peripheral groove and binding band components.

FIGS. 22A and 22B show a further enhancement to the radial compression afforded by the bands. A strap 654 is anchored in one binding band quadrant at 652. In the view of FIG. 22A and B, the band extends to the right, encircling the binding bands and then arrives at a ratchet 656. The ratchet 656 can be actuated to exert tension on the strap 654, squeezing the binding bands radially inwardly, and forcing the stave edges into tight contact, to prevent leakage. As can be seen in FIG. 21, the spacer 644 is slightly shorter than the plates 642, forming an annular groove in which the strap can reside.

The above-described assembly for the binding bands can be applied to the four binding bands shown in the figures. Other embodiments may have numbers of bands other than four.

Figure 23:
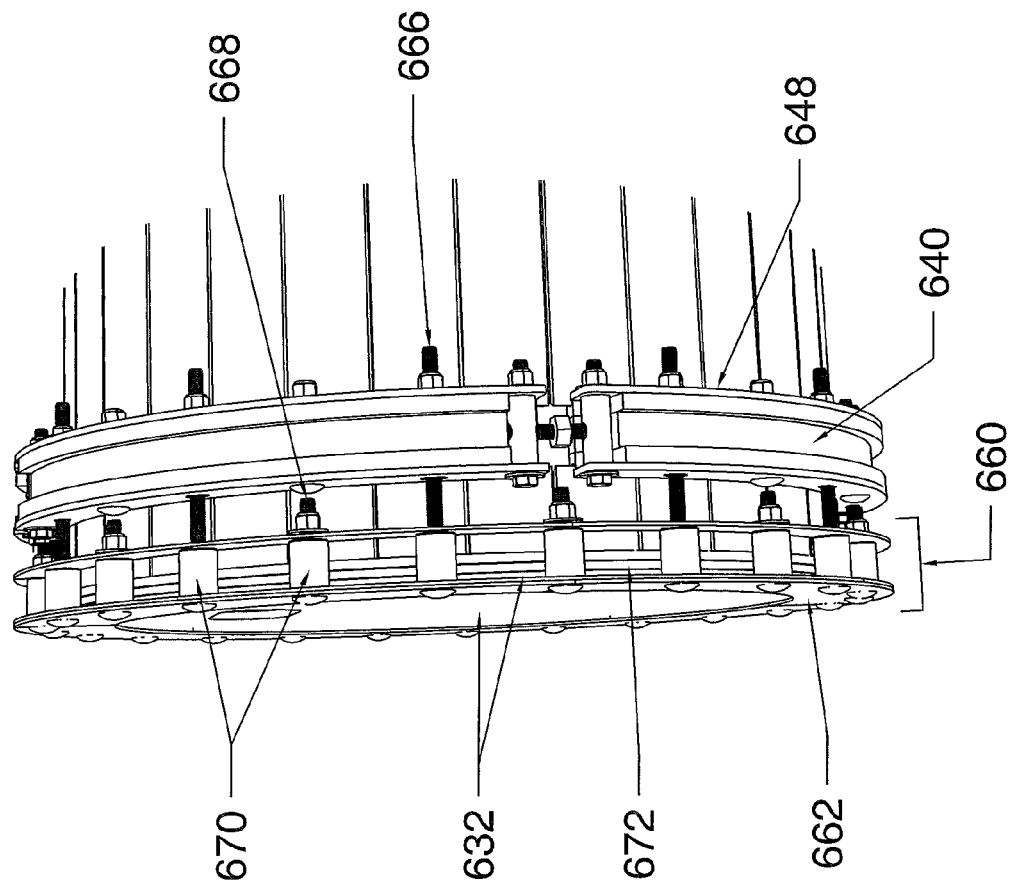
FIG. 23 is a view of the embodiment of FIG. 19, showing a side view of an end cap retainer.

FIG. 23 shows a retainer assembly 660 for an endcap 632 (with or without the transparent end cap 672). The retainer assembly includes an end ring 662 and a supplemental ring 664. These two rings are held spaced apart by nylon spacers 670, with through-bolts and nuts 668. Circumferentially between the spacers 670 are longer bolts 666. The end ring 662 and supplemental ring 664 have outer diameters that are about the same as the diameters of the binding bands. The end ring 662 has an inner diameter less than the inner diameter of the binding bands, so that it extends inward of the outer faces of the assembled staves and can therefore bear against the endcap 632. The long bolts 666 pass through the assembly 660 and engage in the adjacent binding band 640, but the shorter bolts do not extend that far. The tightening of the long bolts 666 to the binding band pulls the end cap downward. Distortion of the flatness of the end ring 662 at high force levels is prevented by the reinforcing presence of the supplemental ring 664 and spacers 670.

Certain modifications and improvements will occur to those skilled in the art upon reading the foregoing description. It should be understood that all such modifications and improvements have been omitted for the sake of conciseness and readability, but are properly within the scope of the following claims.

What is claimed is:

1. A barrel comprising a plurality of staves having an inner face, an outer face, side faces, and end faces, each stave defining an outer crosswise female dovetail groove oriented such that when the staves are assembled into a barrel, the outer crosswise grooves are circumferentially aligned around the barrel; a binding band encircling the barrel with a male dovetail portion of the binding band residing in the outer crosswise grooves; and end caps contacting the end faces of the staves forming closed ends of the barrel.

2. The barrel of claim 1 wherein the binding band is formed from upper and lower plates with a spacer positioned therebetween.

3. The barrel of claim 1 wherein at least one of the end caps includes a transparent end cap.

4. The barrel of claim 1 wherein the end cap is attached to the barrel with a retainer assembly that includes an end ring and a supplemental end ring separated therebetween by spacers, the end ring having an inner diameter sized to bear against the end cap, and bolts circumferentially positioned within the spacers for compressing the retainer assembly to a binding ring on the barrel.

5. The barrel of claim 1 wherein the plurality of staves each define grooves formed in the side faces of the staves that extend the length of the stave.

6. The barrel of claim 1 further comprising one or more keys that engage the grooves in the side faces of adjacent staves along substantially the entire length of the grooves.

7. The barrel of claim 1 further comprising a strap connected to the binding band that encircles the barrel.

8. The barrel of claim 7 wherein the strap terminates at a ratchet that can be actuated to exert tension on the strap, squeezing the binding band radially inward.

9. The barrel of claim 1 wherein the binding band defines the shape of an arch.

10. The barrel of claim 1 wherein the stave inner face is formed from a first species of wood selected for interaction with barrel contents and the stave outer face is formed from a material not the first species of wood.

11. A barrel for flavoring beverages comprising a plurality of staves having an inner face, an outer face, side faces, and end faces and grouped into barrel quarters, each stave defining grooves formed in the side faces of the staves that extend the length of the stave and an outer crosswise groove oriented such that when the quarters are assembled into the barrel, the outer crosswise grooves are circumferentially aligned around the barrel; keys that engage the grooves in the side faces of adjacent staves along substantially the entire length of the grooves; a binding band formed from upper and lower plates with a spacer positioned therebetween and encircles the barrel with a portion of the binding band residing in the outer crosswise grooves; end caps contacting the end faces of the staves forming closed ends of the barrel; and a strap connected to the binding band that encircles the barrel and terminates at a ratchet that can be actuated to exert tension on the strap, squeezing the binding band radially inward.

12. The barrel of claim 11 wherein the outer crosswise groove defines a female dovetail and the upper and lower plates each define a male dovetail component that engages the female dovetail.

13. The barrel of claim 11 wherein at least one of the end caps includes a transparent end cap.

14. The barrel of claim 11 wherein the binding band defines the shape of an arch.

15. The barrel of claim 11 wherein the stave inner face is formed from a first species of wood selected for interaction with barrel contents and the stave outer face is formed from a material not the first species of wood.

16. The barrel of claim 11 wherein the end cap is attached to the barrel with a retainer assembly that includes an end ring and a supplemental end ring separated therebetween by spacers, the end ring having an inner diameter sized to bear against the end cap, and bolts circumferentially positioned within the spacers for compressing the retainer assembly to a binding ring on the barrel.

* * * * *